(12) United States Patent
Huopaniemi et al.

(10) Patent No.: US 6,476,306 B2
(45) Date of Patent: Nov. 5, 2002

(54) METHOD AND A SYSTEM FOR RECOGNIZING A MELODY

(75) Inventors: Jyri Huopaniemi, Helsinki (FI); Timo Sorsa, Helsinki (FI); Peter Boda, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/966,476

(22) Filed: Sep. 27, 2001

(65) Prior Publication Data

US 2002/0038597 A1 Apr. 4, 2002

(30) Foreign Application Priority Data

Sep. 29, 2000 (FI) .............................. 20002161

(51) Int. Cl.[7] .............................. G10H 1/26; G10H 1/40
(52) U.S. Cl. ...................... 84/609; 84/611; 84/DIG. 12
(58) Field of Search .................. 84/609–614, 649–652, 84/DIG. 12

(56) References Cited

U.S. PATENT DOCUMENTS

| | | | |
|---|---|---|---|
| 5,703,308 A | 12/1997 | Tashiro et al. ................ 84/609 |
| 5,739,451 A | 4/1998 | Winksy et al. ................ 84/609 |
| 5,874,686 A | 2/1999 | Ghias et al. .................. 84/609 |
| 5,963,957 A | 10/1999 | Hoffberg ..................... 707/104 |
| 6,307,139 B1 * | 10/2001 | Iwamura ................... 84/609 X |

FOREIGN PATENT DOCUMENTS

EP 0944033 A1 9/1999

OTHER PUBLICATIONS

"Towards A Digital Library Of Popular Music", Bainbridge et al., Proceedings of 1999 Conference on Digital Libraries.

* cited by examiner

*Primary Examiner*—Stanley J. Witkowski
(74) *Attorney, Agent, or Firm*—Perman & Green, LLP

(57) ABSTRACT

The invention relates to a method for recognizing a melody from a set of stored melodies. In the method, an audio sample representing the melody to be recognized is produced to form a first search criterion. In the method, an audio sample is produced of at least one word related to the melody to be recognized to form a second search criterion, wherein in the recognition, a first search set is formed of the stored melodies on the basis of one said search criterion. Another said search criterion is used for recognizing the melody from said first search set.

18 Claims, 3 Drawing Sheets

METHOD AND A SYSTEM FOR RECOGNIZING A MELODY

BACKGROUND OF THE INVENTION

The present invention relates to a method for recognizing a melody from a set of stored melodies, in which an audio sample representing a melody to be recognized is produced to form a first search criterion. The invention also relates to a system for recognizing a melody comprising means for storing melodies, means for recognizing a melody from a set of stored melodies, means for producing an audio sample representing a melody to be recognized, and means for forming a first search criterion on the basis of said audio sample. Further, the invention relates to a dabatase server comprising means for storing melodies, means for recognizing a melody from a set of stored melodies, means for receiving an audio sample representing a melody to be recognized, and means for forming a first search criterion on the basis of said audio sample.

TECHNICAL FIELD OF THE INVENTION

Tremendous growth in multimedia information has increased the need to develop search methods for searching for specific multimedia information, such as pieces of music or other melodies, from this multitude. Text-based search methods are known, whereby keywords entered by a user, e.g., on the keyboard of a computer can be used to search for a desired piece of music or another melody. These pieces of music are stored in a database to which a data transmission connection can be set up, or the data can be stored locally, for example, in jukeboxes or, e.g., on compact discs in the user's own music archive. A drawback in this system is, inter alia, that the size of the database can be very large, wherein the search cannot be limited by a few key words to be sufficiently small, and it may be time consuming to find the exactly relevant information. Furthermore, the user of such a search system may not remember all the essential information about the piece of music to be searched for, wherein the search may result in a large number of possible pieces of music, of which the user must then try to find out the one that corresponds to the piece of music that was searched for.

Recognition methods and devices based on sound recognition have also been developed that can be used to search from audio samples, such as pieces of music, stored in a database, for a specific sample by humming a part of this piece of music to be searched for. Thus, in the system, a comparison is made on the basis of the humming and the pieces of music stored in the database. Such music-based databases have been compiled, e.g., in servers coupled to the Internet data network, wherein these databases can be globally accessed. The quantity of information contained in such databases is very large, wherein searching by humming can take a considerably long time. Furthermore, the length of search keys required for the searches increases with the quantity of information contained in the databases, which may impair the accuracy of the recognition. The recognition is further made more difficult by the fact that people hum the same audio sample in different ways, wherein it is difficult for the recognition system to find the exactly relevant piece. Thus, the retrieval system will give as the retrieval result numerous pieces of music which possibly correspond to the audio sample that was hummed. After this, the user must still find out by listening which of the pieces of music given by the retrieval system correspond to the piece searched by the user. In some situations, it may even happen that the retrieval system does not find the piece that the user tried to hum. In such a system based on acoustic recognition, the audio sample used can be, instead of or besides humming, an audio sample that is whistled and/or recorded or played with an instrument. In such a system based on acoustic recognition, solutions are used in which the aim is not to find quite precise conformity, but slight differences are allowed in the search, e.g., due to the above-mentioned sources of error.

The U.S. Pat. No. 5,874,686 presents an apparatus and a method for searching for a melody. The user hums a piece of music to be searched, and this humming is input in a computer for processing. The humming is converted to a sequence of digitized representations of relative pitch differences between successive notes. After this, the database is searched for a piece of music or melody which at least roughly resembles the digitized sample sequence formed of the humming.

In such search systems, it is important for the user that the system gives some kind of a response to entering the search command as quickly as possible. Furthermore, users prefer communication between people to conventional communication between man and machine. Thus, the implementation of the user interface of the search system should be significantly considered to avoid inconvenient and slow use of the search system. Furthermore, the use of text-based systems, e.g., on the keyboard of a portable device may in some situations be difficult.

SUMMARY OF THE INVENTION

To accelerate the search, the information contained in the database can be divided into smaller sub-areas, e.g., upon the collection of the database, wherein the search is subjected to one sub-area at a time. However, such an arrangement has, e.g., the drawback that the user should be aware of this distribution of information to be able to first select the correct sub-area for the search.

It is an aim of the present invention to provide a method of searching for melodies, whereby the search can be accelerated compared to methods of prior art. It is also an aim of the invention to provide a system of searching for pieces of music. The invention is based on the idea that for searching for pieces of music, the user says one or several key words related to the piece to be searched for and also utters an audio sample of the piece of music to be searched for, e.g., by humming, whistling or in another way. More precisely, the method according to the invention is primarily characterized in that in the method, an audio sample is produced from at least one word related to the melody to be recognized to form a second search criterion, wherein in the recognition, a first search set is formed of the stored melodies on the basis of one said search criterion, and one other said search criterion is used for recognizing the melody from said first search set.

The system according to the present invention is primarily characterized in that the system further comprises means for producing an audio sample from at least one word related to the melody to be recognized to form a second search criterion, means for forming a first search set of the stored melodies on the basis of one said search criterion, and means for recognizing the melody from said first search set on the basis of one other said search criterion. Further, the database server according to the present invention is primarily characterized in that the database server further comprises means for producing an audio sample from at least one word related to the melody to be recognized to form a second search criterion, means for forming a first search set of the stored melodies on the basis of one said search criterion, and means for recognizing the melody from said first search set on the basis of one other said search criterion.

Considerable advantages are achieved by the present invention compared to search solutions of prior art. When applying the method of the invention, the actual melody search can be restricted to a narrower field, wherein the search can be made faster and more accurately than when applying solutions of prior art. Furthermore, in the search system according to the invention, the audio signal uttered by the user is subjected to automatic separation of speech-containing parts from music-containing parts, wherein the use of such a search system more closely resembles communication between people than communication between man and machine. This makes the use of the system more convenient and faster compared to systems in which the user must, e.g., type search conditions on a keyboard.

BRIEF DESCRIPTION OF THE DRAWINGS

In the following, the invention will be described in more detail with reference to the appended drawings, in which.

DETAILED DESCRIPTION OF THE INVENTION

Figure 1:
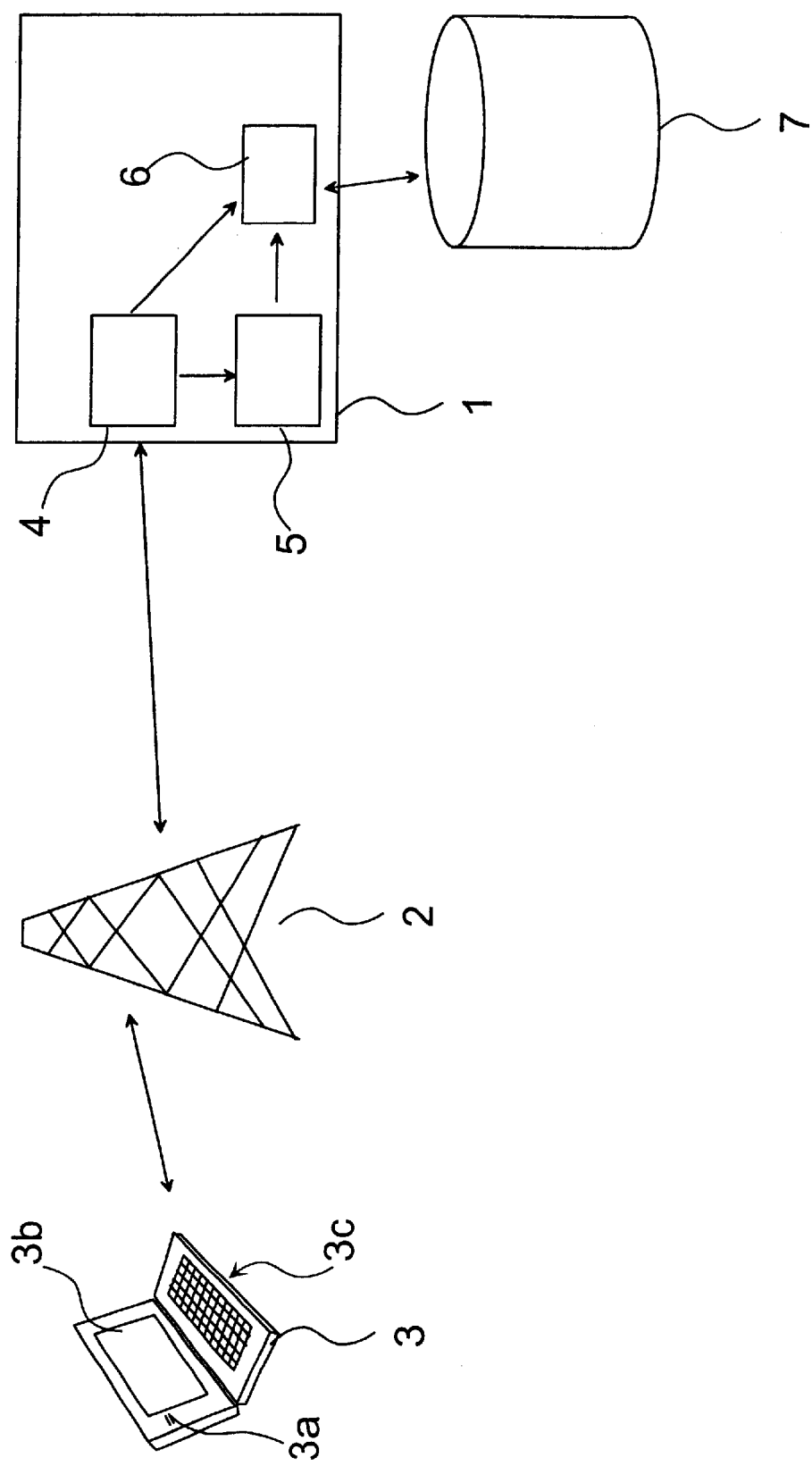
FIG. 1 shows a system according to a preferred embodiment of the invention in a reduced block chart.

In the following, the invention will be described by using as an example the system shown in FIG. 1, comprising a database server 1, a communication network 2 and a terminal 3. By means of the terminal 3, the user can specify the information required for the search, such as a search condition in text form as well as an audio sample, on the basis of which the search will be made. The terminal 3 is arranged to communicate with the communication network 2 which further communicates with the database server 1. The communication network 2 can comprise one or several communication networks, such as a mobile telephone network, a public switched telecommunication network, etc. Furthermore, there may be several database servers 1 coupled to the communication system. The communication between the terminal 3 and the database server 1 can also be implemented as a cable connection or a short-range wireless connection, such as infrared or radio connection (e.g., Bluetooth, WLAN), or the like. The terminal 3 can be for example a wireless communication device or a computer (e.g., a PC), but also other data processing devices can be applied in connection with the present invention. One application example to be mentioned is a system in which the terminal 3 is a computer that is arranged to communicate with the Internet data network. Thus, the voice connection used can be, e.g., the Internet application Voice over IP (VoIP), known as such. Furthermore, the database server 1 can be located in the communication network, or it can also be implemented locally in connection with the terminal 3. A database 7 can be compiled in the database server 1, or it can be separate from the database server 1, wherein a data transmission connection can be set up between the database server 1 and the database 7.

Figure 2:
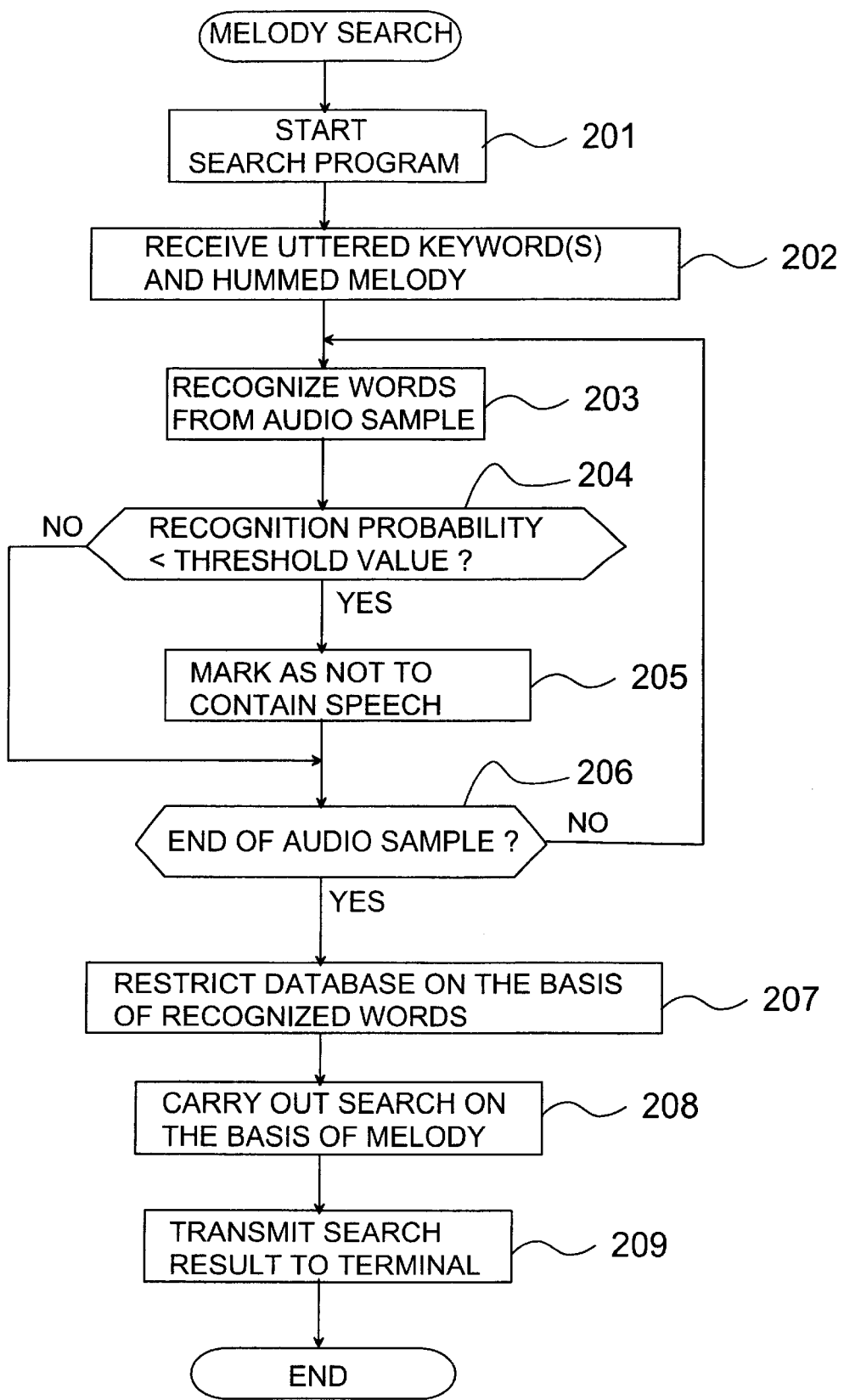
FIG. 2 shows the method according to a preferred embodiment of the invention in a flow chart.

FIG. 2 shows the method according to a preferred embodiment of the invention in a flow chart. To search for a certain piece of music or another melody heard, e.g., from the radio, the user starts a search program or the like intended for this purpose, e.g., an Internet browser, in the terminal 3 (block 201). By means of this search program, the user can set up a data transmission connection to the database server 1 in which the user wishes the search to be carried out. This is performed in a way known as such, e.g., by entering the address of the database server on the keyboard. In the Internet network, this address is e.g. in the format "http://www.databaseserver.com". The provider of the database search service has determined on his so-called home page, e.g., a link where the user can move on to the search function. After this, the system preferably shifts to a speech recognition mode. Thus, the user is, e.g., requested to utter one or more words related to the piece of music to be searched and to hum, or reproduce in another way, the melody, or a part of it, of the piece of music. Next, the user utters in the microphone 3a of the terminal 3 (see FIG. 1) or enters on the keyboard one or more words describing the piece to be searched for and, for example, hums a part of the piece of music or the melody that the user would like to retrieve (block 202). For example, the user utters "Get me from Beatles the following . . . (whistling) . . . ". This part to be hummed or, e.g., whistled does not need to be from the beginning of the piece of music, but instead it can also be from another part of the piece of music to be retrieved. The audio sample used can also be a sound formed by a sound reproducer. For example, the user is listening to the radio and when hearing a piece of music or another melody, the user utters one or more search keys related to the piece in the microphone 3a of the terminal 3, such as a wireless communication device. Thus, in addition to the word or words uttered by the user, the melody formed by the sound reproducer is transferred via the microphone 3a of the terminal to further processing for the recognition. Consequently, in such a situation, the user does not need to produce the sound sample by him/herself.

The audio signal entered by the user is preferably converted to digital format in the terminal 3, and the digitized audio sample is converted to a format that can be transmitted in the communication network, e.g., to packet format, which is known as such from, e.g., digital mobile phones. The information produced from the audio signal is transmitted from the terminal 3 via the communication network 2 to the database server 1.

Figure 3:
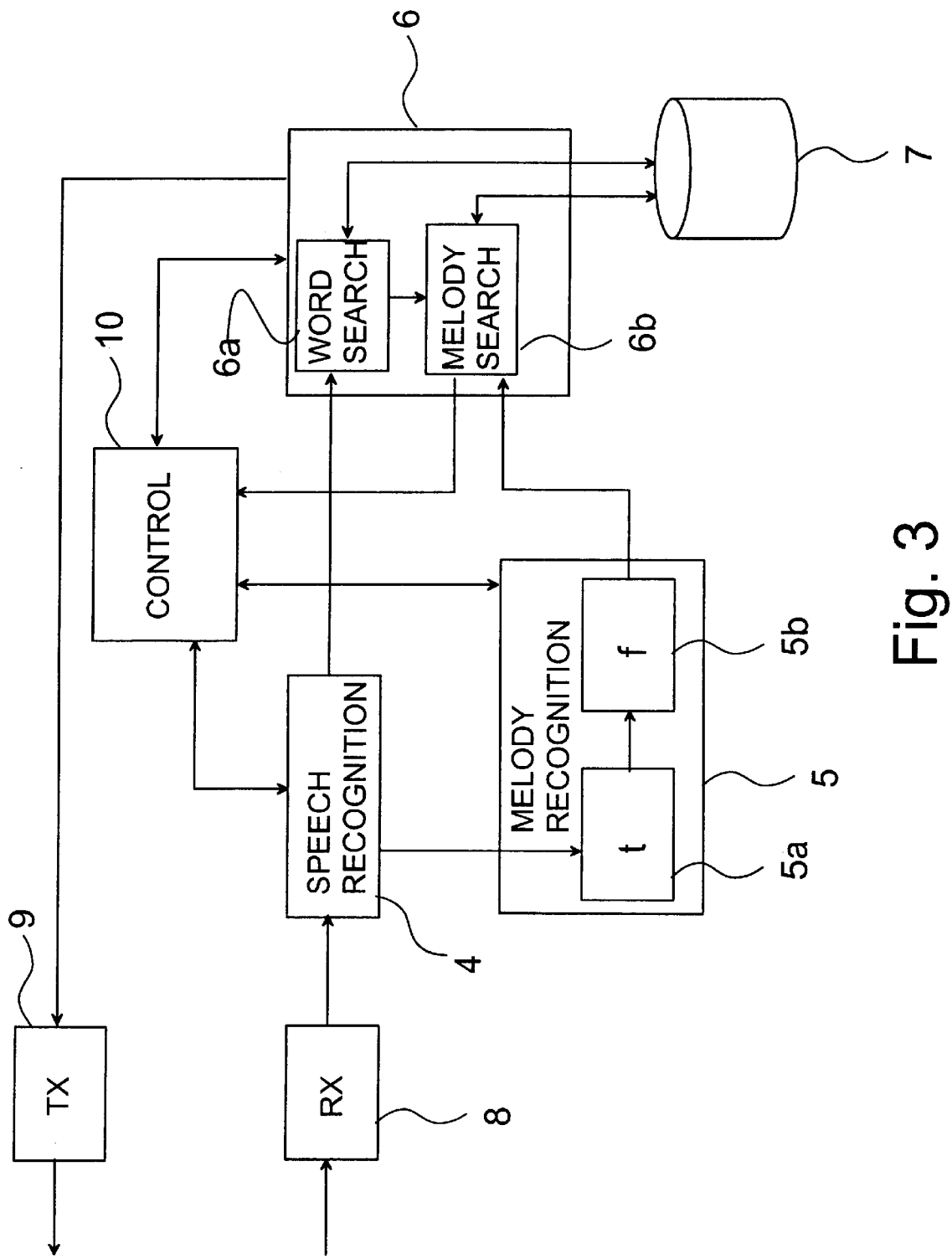
FIG. 3 shows a database server according to a preferred embodiment of the invention in a reduced block chart.

FIG. 3 shows, in a reduced block chart, a database server 1 according to a preferred embodiment of the invention. The database server 1 is used, e.g., for analysing the audio signal. To perform this, the received information can first be converted to an analog signal, if necessary, after which it is led to a speech recognition means 4. In some applications, the signal can be processed directly in digitized format, wherein no conversion to an analog signal is necessary. In the speech recognition means 4, the audio signal is preferably processed as sample sequences, wherein the audio signal is represented by a set of samples.

The database administrator may have compiled a search key index on the pieces of music stored in the database, containing search information related to each piece of music, such as the performer, composer, title, etc. The speech recognition means 4 used can be e.g. a speech recognizer with a limited vocabulary, wherein even tens of thousands of words can be recognized by speech recognition algorithms in a way substantially independent of the speaker. On the other hand, also other types of speech recognition means 4 can be used. Thus, the speech recognizer means 4 attempts to recognize speech, e.g., on the basis of phonemes distinguishable from the user's speech and speech response information stored in the speech recognition means 4.

The speech recognition means 4 tries to recognize words uttered by the user (block 203) by using, e.g., a so-called reliability measure. This reliability measure indicates how reliably a word has been recognized. At the stage when this reliability measure falls below a predetermined value (block 204), the speech recognizer assumes that there is no speech or no word or phoneme recognized by the speech recognition means 4. Thus, the speech recognizer 4 marks the received audio sample with information at which point or points in the audio sample no speech was recognized (block 205). Such a method applying a reliability measure is known as such in speech recognition systems of prior art. Next, it is examined in block 206 if there are still unexamined parts in the audio sample. After the received audio sample has been processed, at least those parts of the audio sample that were marked by the speech recognition means 4 not to contain speech, are transferred to a melody recognition means 5 to generate a search criterion for recognizing the piece of music or melody. Substantially, only those parts of the audio sample are used here that were marked by the speech recognizer 4 as parts containing no speech. Thus, it is assumed that these parts contain a music sample, such as a hummed music sample or one played from a tape or on the radio. By this method, according to an advantageous embodiment of the invention, the search can be accelerated, because the quantity of information to be searched can be restricted on the basis of key words. Furthermore, the user can coherently utter key words and produce an audio sample by humming, whistling or in another way, which is faster than entering keywords on a keyboard.

Speech recognizers typically produce information on the frequency content (spectrum) contained in speech. Thus, this information on the frequency content can also be utilized to generate the search criteria required for recognizing a melody. The sample that is hummed or produced in another way is converted to a kind of search key that is used for browsing the database to find parts of melodies or pieces of music of similar type. This conversion can be made, for example, by recognizing first the durations of notes and pauses contained in the sample, as well as the pitch of each note. These data are transmitted to a search block 6. Also information about the key words contained in the audio sample, obtained from the speech recognition, is transmitted to the search block 6. After this, the search block 6 examines the database 7 preferably so that for further processing, the database 7 is first restricted only to information matching the key words uttered by the user (block 207). The key words can be, for example, the name of a band or a composer, such as the Beatles or Beethoven, music classification, such as classical/pop, etc. Next, a search is made from this restricted set on the basis of the search criteria formed by the melody recognition means 5 (block 208). In the search block 6, information on pieces of music contained in the database 7, such as durations and pitches of notes, is compared with the corresponding information contained in the search criteria. This comparison should be made so that the aim of the search is not to find a perfectly matching piece of music, but one or a few such pieces of music which most resemble the piece of music to be retrieved from the set of pieces of music to be searched.

After the search block 6 has found one or more pieces of music which correlate, at a certain probability, with the piece of music to be searched for, the database server 1 sends information about the retrieved pieces of music to the terminal 3. In the terminal 3, this information can be represented, e.g., on a display 3b (FIG. 1), wherein the user can select, e.g., one piece of music (block 209). This selection can be made on a keyboard 3c and/or as sound commands. The selection information is transmitted to the database server 1 which transmits the selected piece of music or a part of it to the terminal 3. If the selected piece was not correct, the user can make a new selection, wherein the selection information is transmitted to the database server for transmitting to the terminal 3 the piece of music now selected. After the correct piece has been found, the user can play it in the terminal 3, store the piece in the memory means, and/or transmit the piece of music to a device suitable for music reproduction, such as a so-called MP3 player.

Instead of or in addition to the above-mentioned list formed on the basis of the search result, the database server 1 can transmit audio samples of the retrieved pieces of music, wherein the audio sample can be, e.g., played by means of the speaker in the terminal 3. Thus, the user can indicate, e.g., by speech, which audio sample corresponds to the piece of music searched for.

Pieces of music are transferred from the database server 1 to the terminal 3 preferably in digital and compressed format. For this purpose, the MPEG standard has been developed, wherein MP3 players can convert these compressed data to sound. Compression has, e.g., the advantage that the quantity of information to be transferred can be made more compact than when music is transferred without compression. In a corresponding manner, also less storage capacity is required for storing pieces of music in the terminal 3 and in the database server 1.

It is obvious that the words restricting the search do not need to be in the beginning of the audio sample, but the user can first hum the melody to be searched for and after that, or somewhere in between, utter one or more key words to restrict the search. The speech recognition means 4 determines from the audio signal the parts which contain speech. In the melody recognition means 5, correspondingly, search criteria are formed from the parts which contain no speech in the audio signal. Also in this situation, speech-containing parts can first be used to restrict a suitable subset of the database, where pieces of music best matching the melody sample formed by humming or in another way are searched from.

The method of the invention can be used, e.g., for playing music without the user carrying a large set of audio recordings, such as compact discs (CD) or digital versatile discs (DVD). The invention can also be applied, for example, for retrieving various ringing tones to a wireless communication device. Another advantageous application of the invention is a jukebox, wherein the user can utter, via a microphone in the user interface (not shown) arranged in the jukebox, e.g., the title of a piece of music, as well as hum the piece which the user wishes to be played. It is thus possible, in the display of the interface of the jukebox, to display a selection list formed as a result of the search, from which the user can select a desired piece of music, as presented above in this description. In this application, the whole system presented above is preferably arranged in connection with the jukebox, wherein no communication network 2 is necessary. In this case, it is sufficient that there is a local data transmission connection between the user interface and the database server, which connection can be wireless or wired.

Furthermore, some applications of the invention to be mentioned in this context include purchasing music recordings via a communication network, such as the Internet, and also searching and/or downloading of a ringing tone for a mobile communication device from an Internet page. Thus, the purchaser uses a browser program or the like, started in the terminal, to move on to the home page of a firm selling/supplying pieces of music or ringing tones, from which the purchaser can, e.g., select a sound-based search function. After this, the user utters key words and hums or produces an audio sample in another way to describe the piece of music. The database server 1 searches for the pieces of music in the database of the supplier on the basis of the audio samples given by the purchaser. After the search, the database server preferably transmits a list and/or an audio sample of retrieved pieces meeting the search criteria. The purchaser can thus, before making the purchase decision, make sure that the piece to be bought is exactly the correct one. After finding the desired piece, the purchaser makes payment for the piece of music preferably by using electrical payment methods known as such. After the user has made the payment, the database server 1 transmits the piece of music to be stored in the terminal 3. This arrangement has the advantage that the purchaser can make sure that the piece of music to be purchased is exactly the relevant one. Furthermore, no harm is caused to the supplier, because the length of the audio sample transmitted by the database server 1 to the terminal 3 for recognition can be limited to, e.g., a few seconds. Thus, the purchaser cannot have the whole piece stored without making a payment.

Another application alternative is that the whole system is implemented in one device, e.g., the terminal 3. Thus, the terminal 3 comprises, e.g., the speech recognition means 4, the melody recognition means 5, the database server 1, and the database 7.

FIG. 3 shows a database server 1 according to a preferred embodiment of the invention in a reduced block chart. The database server 1 is provided with receiving means 8 for receiving audio signal information generated by the terminal 1. From the receiving means 8, the audio signal information is led to the speech recognition means 4, where an attempt is made to recognize words in the speech signal uttered by the user. Before the speech recognition, a conversion is made, if necessary, to convert the received audio signal information to a format suitable for the speech recognition means 4. The speech recognition means 4 transmits information on the recognized words to a first search block 6a in the search block 6 to restrict the database 7 on the basis of these uttered keywords. Furthermore, the speech recognition means 4 transmits the samples formed of the audio signal to the melody recognition means 5, at least those parts in which no speech was detected. In this advantageous embodiment, the melody recognition means 5 comprises a first recognition block 5a for determining the durations of notes, as well as a second recognition block 5b for determining the pitches of notes. The melody recognition means 5 transfers the melody information to a second search block 6b in the search block 6 for performing a melody-based search from the database restricted by the first search block 6a. The search results are preferably transmitted via the transmission means 9 to the communication network 2 to be transmitted further to the terminal 3. To control the operation of the database server, it comprises a control block 10, such as a processor or the like. Furthermore, the database server 1 can also comprise other processors, such as signal processing units (not shown), advantageously for implementing, e.g., speech recognition functions of the speech recognition means 4 and melody recognition functions of the melody recognition means 5. The functions complying with the present invention can be largely implemented by program commands in the software of the processors.

Although the invention has been described above primarily in connection with searching for pieces of music, it is obvious that the invention can also be applied for searching other melodies, music videos, rhythms, notes, and the like in the database. For example, a rhythm can be recognized either from the melody or by tapping a microphone or a base to produce a sound which is converted to electrical format by the microphone.

The present invention can also be applied for loading the user's own sound samples in the terminal 3, e.g., as a ringing tone. Thus, the user utters "please send the following tune to my mobile phone: (whistling)". The system replies to this and possibly requests to repeat the audio sample: "Listen again, re-input, . . .", after which the system preferably stores, in the database 7, the audio sample and the related one or more key words, such as the user's name and possibly version information, if the user has already stored audio samples before. In connection with the downloading, the system can still check that the user wishes to download the audio sample: "Do you want to download?", after which the audio sample can be downloaded preferably by following the principles presented above in this description.

Yet another advantageous application example to be mentioned is that the user sings a piece of music. Thus, the speech recognition means 4 forms key words of the lyrics of the song and, correspondingly, the melody recognition means 5 forms search criteria on the basis of the melody, to recognize the piece or music or melody. After this, a search is made in the database, as already presented above.

It is obvious that the present invention is not limited solely to the above-presented embodiments, but it can be modified within the scope of the appended claims.

What is claimed is:

1. A method for recongnizing a melody from a set of stored melodies, the method comprising:

producing an audio sample including first parts having speech and second parts having a melody, the first and second parts located at different time instants in the audio sample;

detecting speech from the audio sample to separate from the audio sample the first parts and the second parts;

on the basis of the separation, forming a first search critrtion from the second parts by producing an audio sample representing a melody to by recognized;

on the basis of the separation, forming a second search criterion by producing an audio sample including at least one word from the first parts;

forming a first search set of the stored melodies on the basis of one of the search criterion; and using another of the search criterion for recognizing the melody from the first search set.

2. The method according to claim 1, further comprising producing the second parts by uttering at least part of the melody.

3. The method according to claim 1, further comprising producing the second parts by reproducing the recorded part of the melody.

4. The method according to claim 1, wherein the first audio sample comprises at least one word related to the melody uttered before or after melody.

5. The method according to claim 1, further comprising producing the second parts by singing, wherein the lyrics of the song are used in the forming of the second search criterion.

6. method according to claim 1, further comprising determining durations and pitches of notes from the second parts to form the first search criterion.

7. The method according to claim 1, further comprising determining a rhythm of the second parts to form the first search criterion.

8. A system comprising:

means (7) for storing melodies;

means (3, 3a) for producing an audio sample including speech and a melody to be recognized;

a speech recognizer for separating the audio sample into parts having speech and parts without speech;

means (5) for forming a first search criterion on the basis of the parts without speech;

means (4) for forming a second search criterion on the basis of the parts having speech;

means (6a) for forming a first search set of the stored melodies on the basis of one of the search criterion; and means for recognizing the melody from said first search set on the basis of another of the search criterion.

9. The system according to claim 8, further comprising:

a database server (1);

a terminal (3); and means for transmitting an audio sample from the terminal (3) to the database server (1), wherein the database server (1) includes:

said speech recognizer;

said means (4) for forming the second search criterion;

said means (6a) for forming the first search set; and said means (6b) for recognizing the melody.

10. The system according to claim 9, wherein the terminal (3) is a wireless communication device.

11. The system according claim 9, wherein the means (2) for transmitting an audio sample from the terminal (3) to the database server (1) comprise a mobile communication network.

12. The system according claim 9, wherein the means (2) for transmitting an audio sample from the terminal (3) to the database server (1) comprise the Internet data network.

13. The system according to claim 9, wherein the stored melodies comprise pieces of music.

14. The system according to claim 9, wherein the stored melodies comprise ringing tones, wherein the terminal (3) comprises means for selecting a ringing tone, and wherein the system comprises means (9) for downloading ringing tones to the terminal (3).

15. The system according to claim 14, wherein the system comprises means (3, 8) for transmitting an audio sample produced by the user and storing it in the database (7), wherein the audio sample is arranged to be used as the ringing tone.

16. The system according to claim 10, wherein the system is arranged to be used for downloading recognized melodies to the terminal (3).

17. A database server (1) comprising: means (7) for storing melodies;

means (8) for receiving an audio sample including speech and a melody to be recognized;

a speech recognizer for separating the audio sample into parts having speech and part without speech;

melody recognition means (5) for forming a first search criterion on the basis of the parts without speech;

means (4) for forming a second search criterion from at least one word in the parts having speech related to the melody to be recognized;

means (6a) for forming a first search set of the stored melodies on the basis of one of the search criterion; and means (6b) for recognizing the melody from said first search set on the basis of another of the search criterion.

18. The database server according to claim 17, arranged in connection with a jukebox.

* * * * *